US011309551B2

(12) United States Patent
Stöhr et al.

(10) Patent No.: US 11,309,551 B2
(45) Date of Patent: Apr. 19, 2022

(54) SEPARATOR PLATE FOR AN ELECTROCHEMICAL SYSTEM (71) Applicant: Reinz-Dichtungs-GmbH, Neu-Ulm (DE)

(72) Inventors: Thomas Stöhr, Laupheim (DE); Claudia Kunz, Ulm (DE)

(73) Assignee: Reinz-Dichtungs-GmbH, Neu-Ulm (DE)

( * ) Notice: Subject to any disclaimer, the term of this patent is extended or adjusted under 35 U.S.C. 154(b) by 343 days.

(21) Appl. No.: 16/618,009

(22) PCT Filed: May 30, 2018

(86) PCT No.: PCT/EP2018/064278
§ 371 (c)(1),
(2) Date: Nov. 27, 2019

(87) PCT Pub. No.: WO2018/220065
PCT Pub. Date: Dec. 6, 2018

(65) Prior Publication Data
US 2020/0153000 A1 May 14, 2020

(30) Foreign Application Priority Data
May 30, 2017 (DE) ...................... 20 2017 103 229.9

(51) Int. Cl.
*H01M 8/0265* (2016.01)
*H01M 8/2483* (2016.01)
(Continued)

(52) U.S. Cl.
CPC ....... *H01M 8/0265* (2013.01); *H01M 8/0206* (2013.01); *H01M 8/0267* (2013.01); *H01M 8/0271* (2013.01); *H01M 8/2483* (2016.02)

(58) Field of Classification Search
CPC .................................................. H01M 8/0265
See application file for complete search history.

(56) References Cited

U.S. PATENT DOCUMENTS

2002/0127461 A1* 9/2002 Sugita ................. H01M 8/2483
429/465

FOREIGN PATENT DOCUMENTS

DE        10248531 A1    4/2004
DE     102007048184 B3    1/2009
(Continued)

OTHER PUBLICATIONS

ISA European Patent Office, International Search Report Issued in Application No. PCT/EP2018/064278, dated Sep. 19, 2018, WIPO, 4 pages.

*Primary Examiner* — Brian R Ohara
(74) *Attorney, Agent, or Firm* — McCoy Russell LLP (57) ABSTRACT The present invention relates to a separator plate for an electro-chemical system. The separator plate comprises: a first passage; an active region with structures for guiding a reaction medium along a first flat face of the separator plate and guiding a coolant along a rear face of the active region on the second flat face of the separator plate; a bead formed in the separator plate for sealing at least the active region; and barrier elements formed in the separator plate, which reduce or prevent a flow of reaction medium on the first flat face of the separator plate along the bead and past the active region. The separator plate fully encloses the first passage and the active region together and that at least one of the barrier elements is at least in parts sunk.

20 Claims, 10 Drawing Sheets (51) Int. Cl.
*H01M 8/0206* (2016.01)
*H01M 8/0267* (2016.01)
*H01M 8/0271* (2016.01)

(56) References Cited

FOREIGN PATENT DOCUMENTS

| | | |
|---|---|---|
| DE | 202014008157 U1 | 2/2016 |
| DE | 202015104972 U1 | 1/2017 |
| DE | 202015104973 U1 | 1/2017 |
| EP | 3171440 A1 | 5/2017 |

* cited by examiner

SEPARATOR PLATE FOR AN ELECTROCHEMICAL SYSTEM

CROSS REFERENCE TO RELATED APPLICATIONS

The present application is a U.S. National Phase of International Patent Application Serial No. PCT/EP2018/064278 entitled "SEPARATOR PLATE FOR AN ELECTROCHEMICAL SYSTEM" filed on May 30, 2018. International Patent Application Serial No. PCT/EP2018/064278 claims priority to German Utility Model Application No. 20 2017 103 229.9, filed on May 30, 2017. The entire contents of each of the above-cited applications are hereby incorporated by reference for all purposes.

TECHNICAL FIELD

The invention relates to a separator plate for an electrochemical system, to a bipolar plate which comprises the separator plate, as well as to an electrochemical system with a plurality of bipolar plates. The electrochemical system can be for example a fuel cell system, an electrochemical compressor, a redox-flow battery or an electrolyser.

BACKGROUND AND SUMMARY

Known electrochemical systems usually comprise a stack of electrochemical cells which are each separated from one another by way of bipolar plates. Such bipolar plates can serve e.g. for the electrical contacting of the electrodes of the individual electrochemical cells (e.g. fuel cells) and/or for the electrical connection of adjacent cells (series connection of the cells). Typically, the bipolar plates are formed from two individual separator plates which are joined-together. The separator plates of the bipolar plate can be joined together with a material fit, e.g. by way of one or more weld connections, and in particular by way of one or more laser weld connections.

The bipolar plates or the separator plates can each comprise or form structures which are configured e.g. for the supply of the electrochemical cells which are arranged between adjacent bipolar plates with one or more media and/or for the away-transport of reaction products. The media can be fuels (e.g. hydrogen or methanol) or reaction gases (e.g. air or oxygen). Furthermore, the bipolar plates or the separator plates can serve for leading a cool-ant through the bipolar plate, in particular through a cavity which is enclosed by the separator plates of the bipolar plate. Usually, the fuel or reaction gas is led on the first side of the separator plate which is often also denoted as the first flat side despite its structures, whereas coolant is led on the second flat side of a separator plate. The cavity then forms between the second flat sides of two separator plates. Furthermore, the bipolar plates can be configured for the onward leading of the waste heat which arises on converting electrical or chemical energy in the electrochemical cell, as well as for sealing the various media channels or cooling channels with respect to one another and/or to the outside.

Barrier elements can be provided between the active region and a bead which delimits the active region to the outside, said barrier elements being arranged and formed in a manner such that they reduce or prevent a flow of reaction medium past the active region. For example, such barrier elements can be formed by way of providing protrusions in the separator plate, said protrusions on the side of the reaction medium rising above the regions of the separator plate which are adjacent thereto.

Furthermore, the bipolar plates usually each comprise at least one or more through-openings. The media and/or the reaction products can be led through the through-openings to the electrochemical cells which are arranged between adjacent bipolar plates of the stack or into the cavity which is formed by the separator plates of the bipolar plate or can be led away from the cells or out of the cavity. The electrochemical cells typically further each comprise one or more membrane electrode assemblies (MEAs). The MEAs can comprise one or more gas diffusion layers which are usually orientated towards the bipolar plates and are formed e.g. as a metal non-woven or carbon non-woven.

In individual cases, it has been found to be problematic that for example coolant is led to some extent on undesirable paths on the side of the separator plates which is away from the electrochemically active side, e.g. in the cavity which is enclosed by the two separator plates of a bipolar plate. Hence e.g. it can occur that coolant which serves predominantly for the cooling of the electrochemically active region of the separator plate or of the bipolar plate is led at least partly past the active region or even past parts of the distributing region and therefore does not contribute to the cooling of the active region or not to a sufficient extent. In particular, given embossed separator plates, the aforementioned barrier elements are formed by way of embossings being incorporated in the direction of the first flat side. These however result in cavities on the second flat side of the respective separator plate and can form additional flow paths for coolant. By way of this, the danger of coolant flowing past (bypassing) the active region on undesirable paths is increased.

Undesirable temperature peaks in the region of the electrochemical cells and/or undesirable pressure losses on leading the coolant can occur as a result of this undesirable coolant bypass. Furthermore, an increased pumping power is necessary for delivering the coolant which is led past the active region. All these undesired effects can possibly negatively influence the efficiency of the electrochemical system.

In order to completely or at least partly prevent this undesired coolant bypass, fillings have been suggested in the document DE202014008157U1, said fillings being arranged e.g. in the edge region of the active region between the individual plates of the bipolar plate, in order to prevent the coolant flowing past the rear side of the electrochemically active region. Despite this, there is a continued need for separator plates or bipolar plates for an electrochemical system, said plates permitting an operation of the system with a high as possible efficiency.

It is therefore the object of the present invention to provide a separator plate and a bipolar plate for an electrochemical system, which permits an operation of the system with a high as possible efficiency.

Hence what is suggested is a separator plate for an electrochemical system, in particular for a bipolar plate of an electrochemical system, comprising: a first through-opening for leading a coolant through the separator plate; an active region with structures for leading a reaction medium along a first flat side of the separator plate and structures for leading a coolant along a rear side of the active region on the second flat side of the separator plate; possibly a first distributing system for leading the coolant between the first through-opening and the active region; a bead which is formed as one part with the separator plate, for sealing at least the active region; and barrier elements which are formed as one part with the separator plate and which are arranged between the active region and the bead or be-tween the possibly present first distributing region and the bead and which are formed in a manner such that they reduce or prevent a flow of reaction medium on the first flat side of the separator plate along the bead and past the active region.

In order to completely or at least partly prevent the flow of coolant coming from the first through-opening into an interior of the bead on the second flat side of the separator plate, the bead runs in a manner such that it completely encompasses the active region and the possibly present first distributing region as well as the first through-opening. In particular, the bead preferably does not cross the flow path of the coolant from the first through-opening to the rear side of the active region. The barrier elements on the second flat side of the separator plate often form an undesirable fluid connection between the rear side of the active region and the bead interior or between a rear side of the possibly present first distributing region and the bead interior, since the protrusion on the first flat side entails an enlargement of the volume on the second flat side. For this reason, at least one of the barrier elements or at least some of the barrier elements are moreover recessed at least in regions for reducing or for preventing a flow of coolant between the rear side of the active region and the interior of the bead and/or between a rear side of the distributing region and the interior of the bead in the region of the barrier elements on the second flat side of the separator plate. By way of this, at least regional recess on of at least one of the barrier elements or at least some of the barrier elements, the cross section of the undesired fluid connections can be reduced and the undesirable coolant flow from the rear side of the active region into the bead interior or from the rear side of the possibly present first distributing region into the bead interior can be reduced. In order on the one hand to minimise the risk of the flow of fuel or reaction gas on undesired paths on the first flat side of the separator plate and on the other hand to minimise the risk of the flow of coolant on undesired paths on the second flat side of the separator plate, it is particularly preferably for the barrier elements to only be recessed in regions.

As already briefly mentioned, the separator plate on its rear side can comprise a distributing structure for distributing coolant onto the rear side of the active region or for collecting coolant which has flowed through the rear side of the active region. This structure preferably reaches from the at least one port bead up to the edge of the rear side of the active region, said edge facing the respective port bead. The distributing region which is formed by the distributing structure can reach e.g. transversely to the flow direction of the coolant along the rear side of the active region up to an end which faces the bead or up to a side edge of the active region which faces the bead.

The separator plate can comprise a second through-opening for leading a coolant through the separator plate. In turn, a distributing region or collecting region for leading the coolant to or from the rear side of the active region and which is hereinafter denoted as the second distributing region can be arranged between the second through-opening and the active region. The bead can then also completely commonly encompass the second through-opening and thus the active region, the possibly present first and/or second distributing region as well as the first and the second through-opening. The first through-opening and the second through-opening are then preferably arranged on opposite sides of the rear side of the active region.

At least with regard to one or more of the barrier elements, the recess can extend over the whole barrier element at least in one direction. This usually demands a transition region, in which the material of the separator plate is reshaped from the plane of the barrier element onto the plane of the recess, so that too small a bending angle can be avoided.

At least with regard to one or more of the barrier elements, the recess can be distanced to the edges of the barrier elements.

At least with regard to one or more of the barrier elements, the recess can have an elongate shape. Moreover, the recess can be aligned parallel or essentially parallel to the bead or to the main extension direction of the bead. The main extension direction of the bead is herein to be understood in that it means the main extension direction of that bead or of that bead section, which lies closest to the barrier element.

At least with regard to one or more of the barrier elements, the recess can be formed in a manner such that at least in a section it reduces by at least by 50 percent, preferably at least 70 percent, particularly preferably at least 90 percent, a cross section, defined perpendicularly to the planar surface plane of the separator plate, of a connection between the rear side of the active region and the interior of the bead on the rear side of the separator plate, said connection being formed by the barrier elements.

At least one or more of the barrier elements can reach up to the active region or a distributing region and up to the bead. If a barrier element reaches up to the bead, then the barrier element can be formed as a direct continuation of the bead, so that the bead feet which face the active region or face the distributing region or the barrier element do not come to rest on one another in the region of the barrier element in a direction transverse to the main extension direction of the bead. On the other hand, it is preferable for regions in which the bead feet which face the active region or one of the distributing regions come to rest on one another to be arranged between two barrier elements along the main extension direction of the bead.

At least one or several of the barrier elements at least in sections can be aligned transversely to the main extension direction of the bead.

At least one or more of the barrier elements can be formed in a manner such that a cross section of the respective barrier element which is defined perpendicularly to the planar surface plane of the separator plate tapers towards the bead, and specifically preferably by at least 50 percent, particularly preferably at least 70 percent. E.g. the cross section can taper along a direction parallel to the planar surface plane of the separator plate, preferably parallel to the bead or to the main extension direction. For example, the tapering can be effected in a step-like manner at least concerning one or several of the barrier elements.

At least some of the barrier elements which are adjacent to one another can be connected to one another, preferably by way of a connection which is aligned parallel to the bead or to the main extension direction of the bead.

The separator plate can further comprise a port bead which completely encompasses the first through-opening.

Inasmuch as the separator plate comprises the previously described second through-opening, it can further comprise a second port bead which completely encompasses the second through-opening, The at least one port bead can herein comprise a feed-through structure which permits a targeted passage of coolant transversely to the port bead. Such structures are known for instance from DE 102 48 531 B4, DE 20 2015 104 972 U1 and DE 20 2015 104 973 U1 of the applicant.

The separator plate can comprise at least one recess of the previously de-scribed type which extends transversely to the flow direction of the coolant along the rear side of the active region in a continuous manner from the active region or from a possibly present distributing region, up to the bead.

The barrier elements of the separator plate can be arranged in a row parallel to the bead or to the main extension direction of the bead. The previously described recess which extends continuously from the active region or a possibly present distributing region to the bead can then be arranged in particular at an end of this row which faces the distributing structure.

The separator plate can comprise at least one barrier element of the previously mentioned type without a recess.

The separator plate can be formed e.g. from a metal sheet, preferably from a stainless steel sheet. The bead and/or the port beads, the structures of the active region, the structures of one or more possibly present distributing regions, the barrier elements and the recesses can e.g. be embossed into the separator plate.

What is further put forward is a bipolar plate for an electrochemical system with a first and with a second separator plate of the previously described type, wherein both separator plates are connected to one another, wherein the first through-openings of the two separator plates are arranged in an aligned manner for forming a first through-opening of the bipolar plate, wherein the two separator plates enclose a cavity for leading a coolant through the bipolar plate and wherein the first through-opening of the bipolar plate is in fluid connection with the cavity.

The two separator plates of the bipolar plate can each additionally comprise the previously described second through-opening. The second through-openings of the two separator plates can then be arranged in an aligned manner for forming a second through-opening of the bipolar plate. Typically, the second through-opening of the bipolar plate is then also in fluid connection with the cavity which is enclosed by the two separator plates. In particular, one of the first and second through-openings is used as an inlet and the outer as an outlet for the same medium.

The barrier elements of the first separator plate and the barrier elements of the second separator plate can be arranged at least regionally in an overlap-ping manner. The recesses of the barrier elements of the first separator plate and the recesses of the barrier elements of the second separator plate can then be arranged at least partly offset parallel to the planar surface plane of the bipolar plate, thus do not coincide given parallel projections into the planar surface plane of the bipolar plate. Alternatively or additionally, the re-cesses of the barrier elements of the first separator plate and the recesses of the barrier elements of the second separator plate are also arranged in an at least partly overlapping manner, thus coincide at least in sections given a parallel projection into the planar surface plane of the bipolar plate.

The cavity which is enclosed between the two separator plates can comprise a first part-space and a second part-space, wherein the first part space is enclosed between the rear side of the second active region the first separator plate and the rear side of the active region of the second separator plate and wherein the second part-space is enclosed between the bead of the first separator plate and the bead of the second separator plate. The second part-space therefore in each of the separator plates can comprise two bead sections which run on sides of the active region which lie opposite one another. The first through-opening of the bipolar plate and the second through-opening of the bipolar plate can then be connected via a first fluid connection which comprises the first part-space, and the first through-opening of the bipolar plate and the second through-opening of the bipolar plate can be connected via a second fluid connection which comprises the second part-space. The first fluid connection therefore typically serves for guiding or leading the main coolant flow which serves for the desired cooling of the active region. The second fluid connection leads the actual undesired flow into the bead interior, wherein the coolant is not available for cooling the active region. A minimal cross section $A_{1,min}$ of the first fluid connection is then preferably larger than a minimal cross section $A_{2,min}$ of the second fluid connection. Herein, it is prefer-ably the case that e.g. $A_{1,min} \geq 5 \cdot A_{2,min}$, preferably $A_{1,min} \geq 10 \cdot A_{2,min}$, particularly preferably $A_{1,min} \geq 15 \cdot A_{2,min}$. Here, for an efficient cooling of the electrochemical system, it is advantageous that the bead interior although being able to be at least partly filled with coolant, however no significantly coolant flow take place in it and the coolant in the bead interior is therefore quasi stationary and hence the coolant which is fed from the first through-opening can be led exclusively or almost exclusively to the rear side of the active region possibly via a distributing region and flows via the rear side of the active region to the second through-opening.

Finally, an electrochemical system with a plurality of bipolar plates of the previously described type is put forward, wherein the bipolar plates of the system are arranged in a stack. Usually, a membrane electrode assembly (MEA) is arranged between adjacent bipolar plates of the stack. The MEAs in the active region of the adjacent bipolar plates can each comprise an ionomer and preferably at least one gas diffusion layer. The MEAs can also each com-prise a reinforced edge region which at least in regions overlaps with the barrier elements and the recesses of the bipolar plates which are adjacent to the MEA. Hence no change of the MEA design is necessary with regard to the state of the art. The sealing elements of the bipolar plates lie on the MEA and the barrier elements are slightly distanced to it in a direction perpendicular to the surface of the bipolar plates.

BRIEF DESCRIPTION OF THE FIGURES

One embodiment example of the invention is represented in the figures and is explained in more detail by way of the subsequent description. Herein, a plurality of features are represented together in combination. However, individual ones of the subsequently described features can also further form the pre-sent invention independently of the further features of the example. Hereinafter, moreover equal or similar elements are provided with the same or similar reference numerals, so that their description is preferably not repeated.

DETAILED DESCRIPTION

Figure 1:
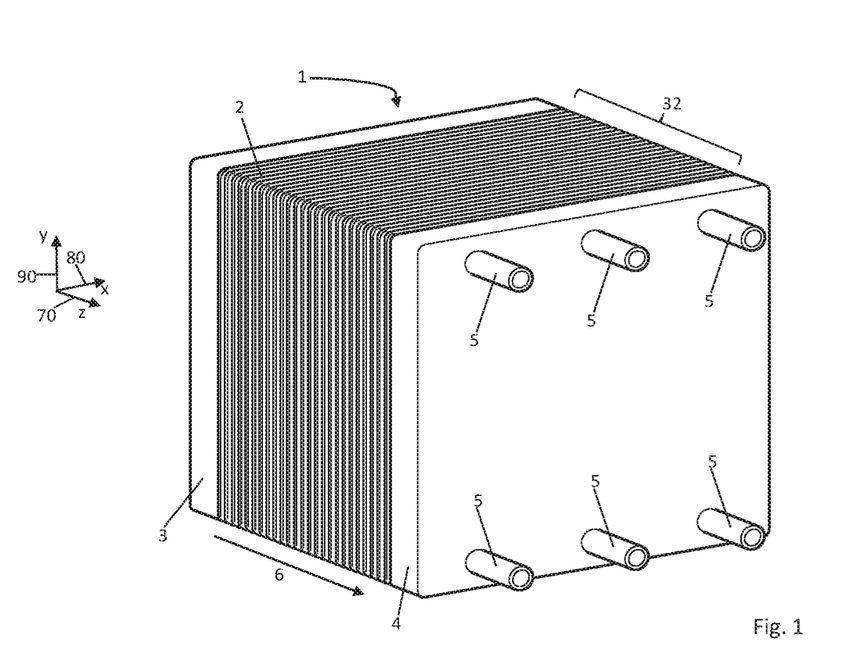
FIG. 1 shows schematically, an electrochemical system according to the invention with a plurality of stacked bipolar plates in a perspective representation.

FIG. 1 shows an electrochemical system 1 according to the invention, with a stack 32 with a plurality of constructionally identical bipolar plates 2 which are stacked along a z-direction 6 and are clamped between two end plates 3, 4. The bipolar plates each comprise two individual plates which are connected to one another, in this document also called separator plates. In the present example, the system 1 is a fuel cell stack. Two adjacent bipolar plates of the stack therefore between themselves enclose an electrochemical cell which serves e.g. for the conversion of chemical energy into electrical energy. The electrochemical cells usually each comprise a membrane electrode assembly (MEA) as well as gas diffusion layers (GDL). Concerning alternative embodiments, the system 1 can just as well be configured as an electrolyser, compressor or as a redox-flow battery. Bipolar plates can also be used in these electrochemical systems. The construction of these bipolar plates corresponds to the construction of the bipolar plates which are explained here in more detail, even if the media which are led on or through the bipolar plates can be different.

The z-axis 70 together with an x-axis 80 and a y-axis 90 spans a right-handed Cartesian coordinate system. The end plate 4 comprises a plurality of media connections 5, via which media can be fed to the system 1 and via which media can be led away out of the system 1. These media which can be fed to the system 1 and led away out of the system 1 can be e.g. fuels such as molecular hydrogen or methanol, reaction gases such as air or oxygen, reduction products such as water steam or coolant such as water and/or glycol.

Figure 2:
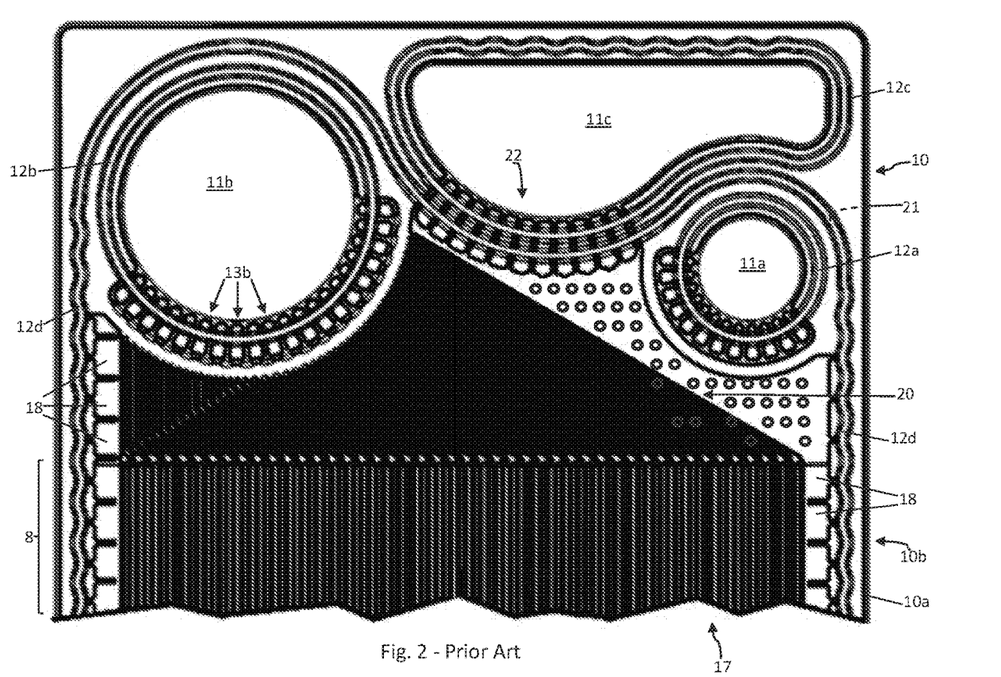
FIG. 2 shows schematically, a bipolar plate which is known from the state of the art, in a plan view.

FIG. 2 shows a detail of a bipolar plate 10 which is known from the state of the art and which can be used e.g. in a system which is related to the electro-chemical system of FIG. 1. The bipolar plate 10 is formed from two individual plates or separator plates 10a, 10b which are joined together materially and of which only the first separator plate 10a which covers the second separator plate 10b is visible in FIG. 2. The separator plates 10a, 10b can each be manufactured from a metal sheet, e.g. from a stainless steel sheet. The separator plates 10a, 10b comprise through-openings which are flush with one another and which form the through-openings 11a, 11b, 11c of the bipolar plate 10. On stacking a plurality of bipolar plates in the manner of the bipolar plate 10, the through-openings 11a-c form conduits which extend through the stack 32 in the stack direction 6 (see FIG. 1). Typically, each of the conduits which are formed by the through-openings 11a-c is in fluid connection with one of the media connections 5 in the end plate 4 of the system 1. For example, the conduits which are formed by the through-openings 11a, 11b serve for the supply of the electrochemical cells of the fuel cell stack with fuel and reaction gas. In contrast, coolant can be introduced into the stack 32 or be led away out of the stack 32 via the conduit which is formed by the through-opening 11c.

For sealing the through-openings 11a-c with respect to the inside of the stack and with respect to the surroundings, the first separator plate 10a comprises beads 12a, 12b, 12c which are each arranged around the through-openings 11a-c and which each completely encompass the through-openings 11a-c. The second separator plate 10b on the rear side of the bipolar plate 10 which is away from the viewer of FIG. 2 comprises corresponding beads for sealing the through-openings 11a-c (not shown).

In an electrochemically active region 8 of the bipolar plate 10, the first separator plate 10a on its front side which faces the viewer of FIG. 2 comprises a flow field 17 with structures for leading a medium along the front side of the separator plate 10a. These structures comprise e.g. a plurality of webs and channels which are arranged between the webs. Only a detail of the active region 8 on the front side of the bipolar plate 10 is shown in FIG. 2. At the front side of the bipolar plate 10 which faces the viewer of FIG. 2, the first separator plate 10a furthermore comprises a distributing or collecting region 20 which in turn comprises structures for leading a medium along the front side of the separator plate 10a, wherein these structures typically likewise comprise webs and channels which are arranged between the webs.

The distributing or collecting region 20 creates a fluid connection between the through-opening 11b and the active region 8. The channels of the distributing or collecting region 20 are therefore in fluid connection with the through-opening 11b or with the conduit through the stack, formed by the through-opening 11b, via feed-throughs 13b through the bead 12b. A medium which is led through the through-opening 11b can therefore be led via the feed-throughs 13b in the bead 12b and via the channels of the distributing or collecting region 20 into the channels of the flow field 17 in the active region 8 of the bipolar plate 10.

The through-opening 11a or the conduit through the plate stack, said conduit being formed by the through-opening 11a, in a corresponding manner is in fluid connection with a distributing and collecting region and via this with a flow field on the rear side of the bipolar plate 10 which is away from the viewer of FIG. 2. In contrast, the through-opening 11c or the conduit through the stack, formed by the through-opening 11c, is in fluid connection with a cavity 22 which is enclosed or encompassed by the separator plates 10a, 10b and which is configured for leading a coolant through the bipolar plate 10.

Finally, the first separator plate 10a yet comprises a further bead 12d which is peripheral around the flow field 17, the distributing or collecting region 20 and the through-openings 11a, 11b and seals these with respect to the through-opening 11c, i.e. with respect to the coolant circuit, and with respect to the surroundings of the system 1. Concerning the bipolar plate 10 which is shown in FIG. 2 and which is known from the state of the art, the bead 12d does not encompass the through-opening 10c which is configured for leading coolant through the bipolar plate 10. Rather, the bead 12d runs in sections between the through-opening 11c and the active region 8 or the flow field 17. This can possibly lead to coolant which coming from the through-opening 11c is led into the cavity 22 between the separator plates 10a, 10b and in particular is led to the rear side of the active region 8 for cooling the active region 8, getting into a bead interior 21 which is formed on the rear side of the separator plate 10a by a bead 12d. This can have the undesirable effect of the cool-ant which has gotten into the bead interior 21, partly following the course of the bead 12d being led around the flow field 17 of the active region 8 and not being available for cooling the active region 8. The subject-matter of the pre-sent invention is an improved separator plate or bipolar plate which completely or at least partly prevents this undesired effect and its disadvantageous consequences.

In order to prevent medium which is to be led from the through-opening 11b into the flow field 17 of the active region 8 from flowing past the flow field 17 along the bead 12d between the bead 12d and the flow field 17, the separator plate 10 further comprises a plurality of barrier elements 18 which following the course of the bead 12d are arranged at regular distances between the bead 12d and the flow field 17 of the active region 8. It is only for the sake of a better overview that only a few of the barrier elements 18 are provided with reference numerals in FIG. 2. On the rear side of the separator plate 10, the barrier elements 18 can partly form undesirable fluid connections be-tween the rear side of the active region 8 and the previously described interior 21 of the bead 12d. Coolant can possibly get from the rear side of the active region 8 via these fluid connections into the bead interior 21 where it cannot contribute to the cooling of the active region 8. This undesirable effect can also be completely or at least partly eliminated with the improved separator plate or bipolar plate which is put forward here.

Figure 3:
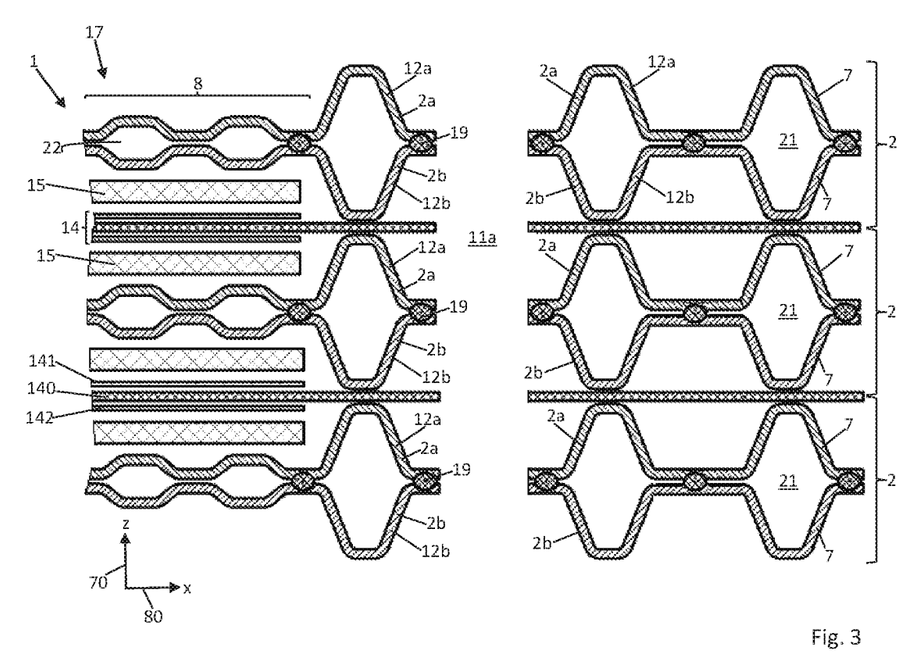
FIG. 3 shows schematically, a detail of the system 1 of FIG. 1 in a sectioned representation.

FIG. 3 shows schematic details of the inner construction of the inventive sys-tem 1 of FIG. 1, in particular a cross section through the fuel cell stack along the x-z-plane. Herewith, at least one cell (fuel cell) 14 is provided, said fuel cell comprising an ion-conductive polymer membrane 140 which is provided on both sides with a catalyser layer 141, 142 at least in an electrochemically active region 8. Furthermore, several bipolar plates 2, between which the fuel cell 14 is arranged are shown. Welds 19 for connecting two metallic layers, more specifically two separator plates 2a, 2b into a bipolar plate 2 are shown next to this. The welds 19 can be created e.g. by way of laser welding. Furthermore, a gas diffusion layer 15 is arranged in the region between each bipolar plate 2 and the nearest fuel cell 14. Herein, a port bead 12a is peripheral around a through-opening 11a of the bipolar plates 2. The port bead 12a serves for sealing the through-opening 11a. The through-opening 11a can serve e.g. for leading hydrogen through the system 1. A bead 7 which is peripheral in the edge region of the bipolar plate 2 serves for the sealing of the electrochemically active region 8 with respect to an environment of the sys-tem 1, so that no media can exit from the active region 8 to the outside or vice versa.

Corresponding to the bipolar plate 10 which is shown in FIG. 2, the bipolar plates 2 according to the invention and the separator plates 2a, 2b which form the bipolar plates 2 mostly comprise six, sometimes also more aligned through-openings (only three such through-openings for are shown in FIG. 2). These on the one hand are usually at least two through-openings for leading cooling fluid through the bipolar plate 2, corresponding to the through-opening 11c of the bipolar plate 10 according to FIG. 2, wherein the corresponding through-openings are each also surrounded by a port bead 12c (see FIGS. 5A and 5B). Furthermore, as the through-openings 11a and 11b which are representatively shown in FIG. 3, in each case at least two through-openings 11a and 11b for the supply and discharge of media into and out of the electrochemically active region 8 are provided, said through-openings each being sealed by further port beads 11a, 11b (see FIGS. 5A and 5B). Furthermore, the bead interiors 21 which are formed by the beads 7, as well as the cavities 22 which are enclosed by the separator plates 2a, 2b of the bipolar plates 2 are highlighted in FIG. 3.

Figure 4A:
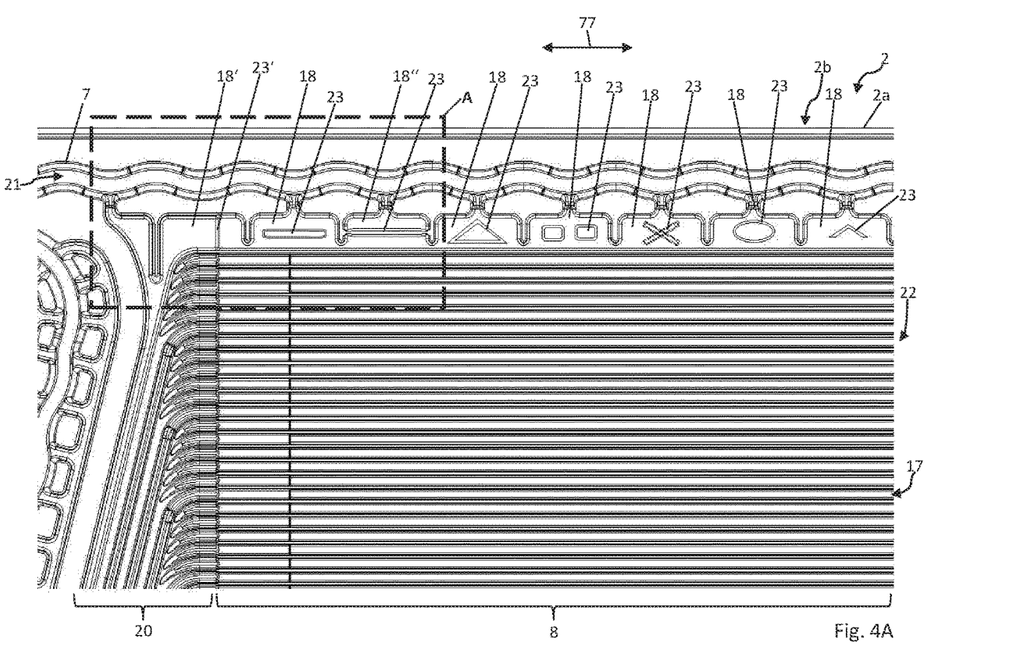
FIG. 4A shows schematically, a detail of the bipolar plate according to the invention in a plan view.

FIG. 4A shows one of the bipolar plates 2 according to the invention, which is joined together from two separator plates 2a, 2b, e.g. by way of laser weld connections in the manner of connections 19 according to FIG. 3. The two separator plates 2a, 2b can have the same features. In particular, FIG. 4A shows a first flat side or front side of the first separator plate 2a of the bipolar plate 2. The second separator plate 2b of the bipolar plate 2 is covered by the first separator plate 2a in FIG. 4A. The separator plates 2a, 2b are each formed from a stainless steel sheet with a sheet thickness of preferably 100 μm at the most. The separator plates 2a, 2b enclose a cavity 22 for leading a coolant through the bipolar plate 2, i.e. for leading a cooling fluid through the bipolar plate 2. The cavity is in fluid connection with through-openings of the bipolar plate 2 which are each formed by aligned through-openings of the separator plates 2a, 2b (not shown in FIG. 4A). These through-openings are e.g. in fluid connections with one or more of the media connections 5 of FIG. 1.

The separator plate 2a at its front side comprises an electrochemically active region 8 with a flow field 17 which comprises structures for leading a reaction medium. The structures of the flow field 17 here comprise a plurality of webs and channels which are arranged between the webs. The structures of the flow field 17 are embossed into the separator plate 2a and are formed as one piece with the separator plate 2a. The active region 8 is completely encompassed by a bead 7. The bead 7 at least in sections has a serpentine course, wherein the main extension direction 77 of the bead in the section of the bead 7 which is shown in FIG. 4A follows the straight course of the outer edge of the separator plate 2a or of the outer edge of the bipolar plate 2. In contrast to the bipolar plate 10 which is known from the state of the art and which is shown in FIG. 2, the bead 7 however not only encompasses the active region with the flow field 17, but additionally the through-opening or the through-openings of the bipolar plate 2 which are in fluid connection with the cavity 22 which is enclosed by the separator plates 2a, 2b (see FIG. 5A). The undesirable flow of coolant into the interior 21 of the bead 7 can therefore be advantageously prevented or reduced. The bead 7 is embossed into the separator plate 2a and is formed as one piece with the separator plate 2a.

The flow field 17 of the active region 8, via a distributing or collecting region 20, is in fluid connection with a further through-opening of the bipolar plate 2 which is formed by two aligned through-openings of the separator plates 2a, 2b (not shown in FIG. 4A). This through-opening in turn is in fluid connection with one or more of the media connections 5 of FIG. 1. The distributing or collecting region 20 also comprises structures for leading the reaction medium, e.g. in the form of webs and channels which are formed between the webs. The structures of the distributing or collecting region 20 are embossed into the separator plate 2a and are formed as one piece with the separator plate 2a. The structures of the distributing or collecting region 20, on the rear side of the separator plate 2a which faces the cavity 22 form a distributing structure for distributing coolant over the rear side of the active region 8 which faces the cavity 22. This distributing structure reaches up to the end of the active region 8 which faces the bead 7.

A plurality of barrier elements 18 is arranged between the bead 7 and the flow field 17 of the active region 8. The barrier elements 18 are each embossed into the separator plate 2a and are formed as one piece with the separator plate 2a. The barrier elements 18 serve for completely or partly pre-venting reactions medium from being able to flow along the bead 7 between the bead 7 and the flow field 17 of the active region 8, past the active region 8. The barrier elements 18 extend from the active region 18 up to the bead 7. In particular, the barrier elements 18 or at least some of the barrier elements 18 each reach up to the structures of the active region 8 and up to the bead 7. For example, the barrier elements 18 can merge into the bead 7 and into the structures of the active region 8.

The barrier elements 18 extend transversely to the bead 7 or to the main extension direction 77 of the bead 7 and transversely to the flow direction of the reaction medium through the active region 8 or transversely to the running direction of the webs and channels of the active region 8. The barrier elements 18 or at least some of the barrier elements 18 are arranged in a row at regular distances following the course of the bead 7. A maximal height of the barrier elements 18 is typically larger than a maximal height of the structures of the active region 8 and smaller than a maximal height of the bead 7, wherein the height of the barrier elements 18, the height of the structures of the active region 8 and the height of the bead 7 are each defined along a direction perpendicular to the planar surface plane of the separator plate 2 or of the bipolar plate 2.

Directly adjacent barrier elements 18 or at least some of the directly adjacent barrier elements 18 are connected to one another or merge into one another at an end which faces the active region 8. In this manner, the end of the barrier elements 18 which faces the active region 8 forms a plane web of a constant height which runs parallel to the bead 7 and parallel to the channels of the active region 8. This can be advantageous e.g. if a preferably reinforced edge region of an MEA is received and pressed between adjacent bipolar plates 2 of the stack of FIG. 1 in the region of the barrier elements 18.

An undesired auxiliary effect of the previously described design of the barrier elements 18 can lie in the fact that the barrier elements 18 or some of them, at the rear side of the separator plate 2a which faces the cavity 22 form a fluid connection between the rear side of the active region 8 and the interior 21 of the bead 7. Coolant can possibly go via this fluid connection from the rear side of the active region 8 into the bead interior 21, where the coolant cannot serve for cooling the active region 8 or only to a sufficient extent.

In order to prevent or at least partly reduce this undesired flow of coolant away from the rear side of the active region 8 into the bead interior 21, the barrier elements 18 or at least some of them comprise recesses 23. Just as the barrier elements 18, the recesses 23 are embossed into the separator plate 2a and are formed as one piece with the separator plate 2a. The cross section of the rear fluid connections which are formed by the barrier elements 18 on the rear side of the separator plate 2a which faces the cavity 22 can be reduced by way of the at least regional recess of the barrier elements 18, so that the flow of coolant away from the rear side of the active region 8 into the interior 21 of the bead 7 is completely or at least partly prevented by the recesses 23. For this, the recesses 23 or at least some of them are prefer-ably formed in a manner such that they reduce by at least by 50 percent, preferably at least 70 percent, particularly preferably at least 90 percent, a cross section, defined perpendicularly to the planar surface plane of the separator plate 2a, of the fluid connection, formed by the respective barrier element 18, between the rear side of the active region 8 and the interior 21 of the bead 7 at the rear side of the separator plate 2a. Herein, the reduction can vary in a direction parallel to the main extension direction 77 of the bead as well as also perpendicularly to this.

As can be derived from the representation of FIG. 4A, the recesses 23 of the barrier elements 18 can be designed differently. For example, the recesses 23 can have an elongate shape, a rectangular shape, an oval shape, the shape of a cross, a V-shape or a triangular shape. Of course, shapes other than those represented here are also conceivable. The recesses 23 or some of them can be aligned, i.e. have their greatest extension parallel to the bead 7 or to the main extension direction of the bead 7 or parallel to the course of the channels of the active region 8.

In FIG. 4A, most of the recesses 23 are distanced to the edges of the barrier elements 18, in particular distanced to the bead 7 and to the active region 8. In this case, the barrier elements 18 have their full or almost full height at least in the edge region, so that they prevent the reaction medium from by-passing the active region 8 despite the recess 23. However, it is also conceivable for the recesses 23 or some of them to extend over the whole width or length of the respective barrier element 23. The coolant flow into the bead interior 21 can therefore be prevented or reduced in a particularly efficient manner.

For example, a barrier element which is characterised at 18' and which does not reach up to the bead 7 comprises a recess 23' which extends transversely to the bead 7 and transversely to the running directions of the channels of the active region 8 over the complete extension of the barrier element 18'. The separator plate 2a is therefore recessed in the region of the recess 23' in a continuous manner from the active region 8 up to the bead 7. The barrier element 18' and the recess 23' are arranged at an end of the row of barrier elements 18, said end facing the distributing structure on the rear side of the distributing or collecting region 20. By way of the recess 23', one can completely or at least partly prevent coolant coming from the distributing structure on the rear side of the distributing or collecting region 20 from flowing into the channels or fluid connections, which are formed by the barrier elements 18 on the rear side of the separator plate 2a. The second separator plate 2b can comprise a corresponding recess 23' at the same location, so that the recess 23' of the first separator plate 2a and the corresponding re-cess 23' of the second separator plate 2b contact one another and prevent the flow of coolant into the region between the bead 7 and the active region 8 as much as possible.

Furthermore, a barrier element which is characterised at 18" comprises a recess 23" which extends parallel to the bead 7 and parallel to the channels of the active region 8 over the entire width of the barrier element 18". In this case too, the second separator plate 2b can comprise a corresponding recess 23" at the same location, so that the recess 23" of the first separator plate 2a and the corresponding recess 23" of the second separator plate 2b contact one another and prevent the flow of coolant into the bead interior 21 at this location as much as possible (see FIG. 6A).

Preferably, the separator plate 2a comprises barrier elements 18 with both types of recesses 23, thus those recesses which extend over the complete width of the respective barrier element 18, as well as those which are distanced from the edges of the respective barrier element 18.

Figure 4B:
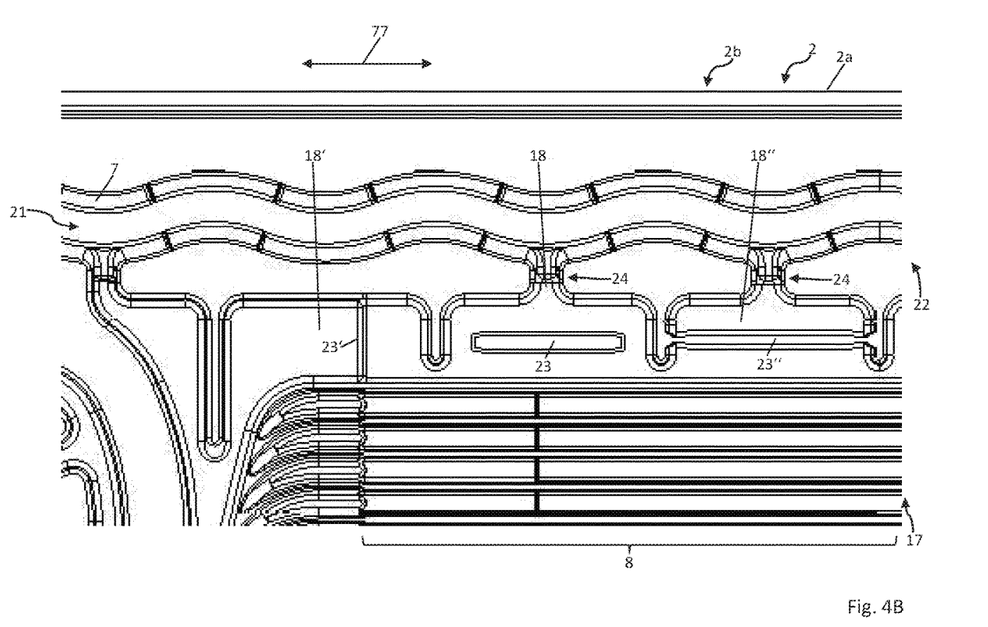
FIG. 4B shows a detail according to the detail A from FIG. 4A.

FIG. 4B shows a detail of the separator plate 2a or bipolar plate 2, which is represented in FIG. 4A, according to the detail A. In particular, in FIG. 4B it is to be seen that the barrier elements 18, 18" which reach up to the flow field of the active region 8 and up to the bead 7, departing from the active region 8 taper towards the bead 7 in an essentially step-like manner in regions 24. The barrier elements 18, 18" are preferably not recessed in the tapering regions 24. In FIGS. 4A and 4B, the cross section, defined perpendicular to the planar surface plane of the separator plate 2a and parallel to the running direction of the bead 7, of the fluid connections formed by the barrier elements 18, 18" on the rear side of the separator plate 2a, are reduced by approx. 80 percent in the regions 24. Concerning alternative embodiments, this cross section in the regions 24 can also taper by at least 50 percent or by at least 90 percent. The cross-sectional taperings in the regions 24 can likewise contribute to the reduction of the undesired inflow of coolant into the bead interior 21 on the rear side of the separator plate 2a.

The cavity 22 which is enclosed between the two separator plates 2a, 2b can comprise a first part-space and a second part-space, wherein the first part-space is enclosed between the active region 8 of the first separator plate 2a and the active region of the second separator plate 2b and wherein the second part-space is enclosed between the bead 7 of the first separator plate 2a and a corresponding bead of the second separator plate 2b. The through-openings 11c for coolant supply can each be connected via first and a second fluid connection, wherein the first fluid connection comprises the first part-space and wherein the second fluid connection comprises the second part-space. Herein, a minimal cross section $A_{1,min}$ of the first fluid connection is preferably larger than a minimal cross section $A_{2,min}$ of the second fluid connection. In particular e.g. it may be the case that: $A_{1,min} \geq 10 \cdot A_{2,min}$, particularly preferably $A_{1,min} \geq 25 \cdot A_{2,min}$.

Figure 4C:
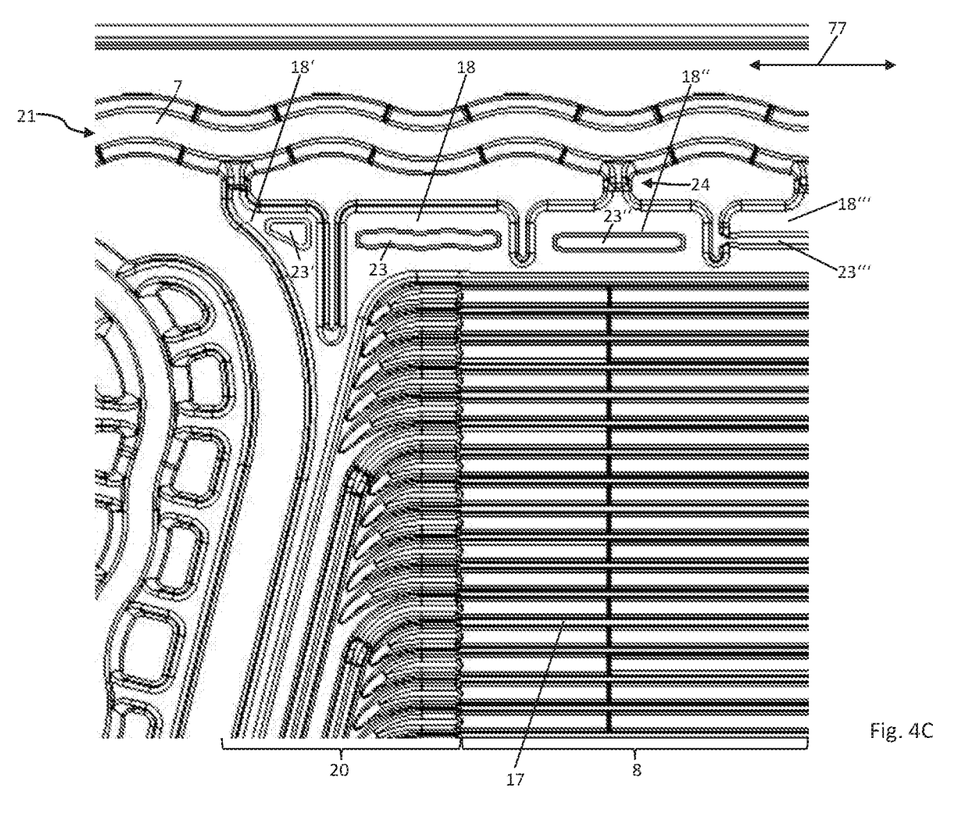
FIG. 4C shows schematically, a detail of a further bipolar plate according to the invention in a plan view.

FIG. 4c shows a plan view of a detail of another bipolar plate 2 according to the invention or of another separator plate 2a according to the invention, which are basically constructed similarly to that in FIGS. 4A and 4B. The separator plate 2a on its front side on the one hand comprises an electrochemically active region 8 with a flow field 17 which comprises structures for leading a reaction medium. A section of the distributing region 20 is shown to the left of this, in which distributing region reaction medium is led on the shown first flat side of the separator plate 2a from a through-opening which is not show to the flow field 17 or vice versa. In contrast, on the rear side of the distributing region 20 coolant is led from a through-opening which is likewise not shown, to the rear side of the flow field 17 or vice versa. Here, barrier elements 18", 18''' are arranged between the bead 7 and the active region 8, and the barrier elements 18 and 18' are arranged between the distributing region 20 and the bead 7. Recesses 23, 23', 23", 23''' which prevent or at least greatly limit a flow of coolant from the rear side of the active region 8 or from the distributing region 20 to the interior 21 of the bead 7 are provided in the region of all these barrier elements 18, 18', 18", 18'''. In particular, it is evident by way of the recess 23' that this with regard to its shape is adapted to that of the associated barrier element 18'.

Figure 5A:
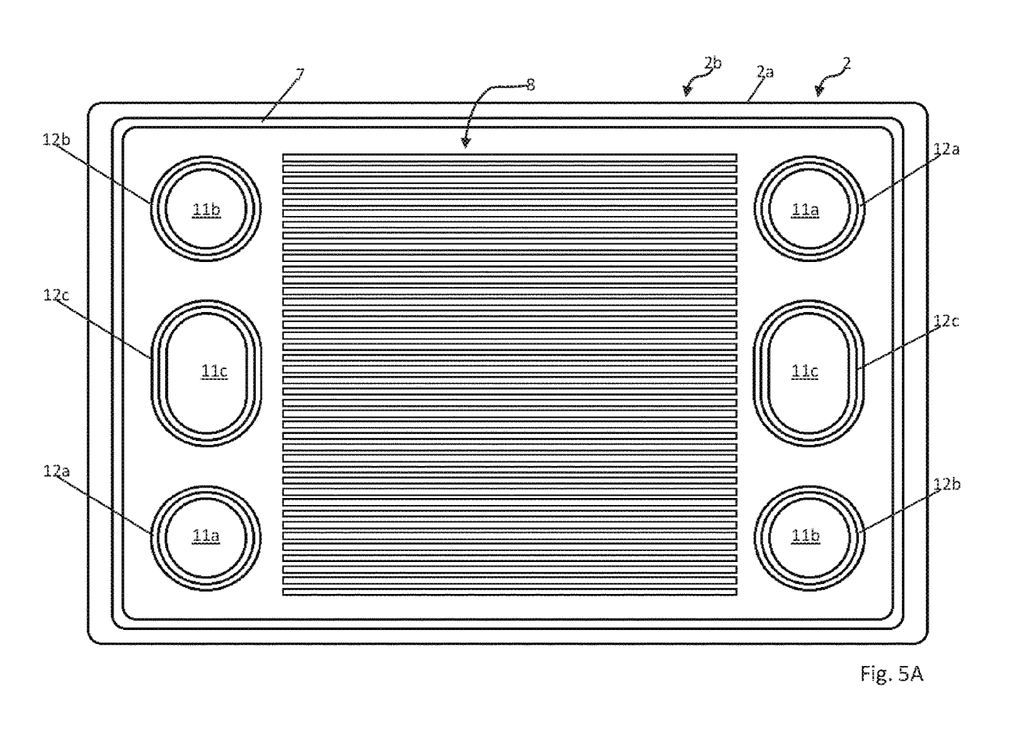
FIG. 5A shows schematically, a bipolar plate according to the invention in a plan view, wherein details which are shown in FIGS. 4A and 4B are not represented for a better overview.

FIG. 5A in a merely schematic manner shows a complete plan view onto the bipolar plate 2 with the separator plates 2a, 2b. Further represented are the structures of the active region 8, the through-openings 11a-c, wherein through-openings which are to be in fluid connection with one another are indicated by the same reference numerals, as well as the bead 7. Differently to the bead 12d of the known bipolar plate 10 according to FIG. 2, the bead 7 of the bipolar plate 2 according to the invention is peripheral around the active region 7, the through-openings 11a-b for leading fuel and reaction media through the bipolar plate 2 and additionally the through-openings 11c for leading coolant through the bipolar plate 2. It is further to be recognised in FIG. 5A that the bipolar plate 2 according to the invention, as already the bipolar plate 10 according to FIG. 2, comprises additional port beads 12a-c which each encompass precisely only one of the through-openings 11a-c and are each formed for sealing precisely one of the through-openings 11a-c. Further details of the separator plate 2a or of the bipolar plate 2, such as for example the barrier elements 18 and the recesses 23, said details having already been shown in FIGS. 4A and 4B, are not represented again in FIG. 5A for the purpose of a better overview.

Figure 5B:
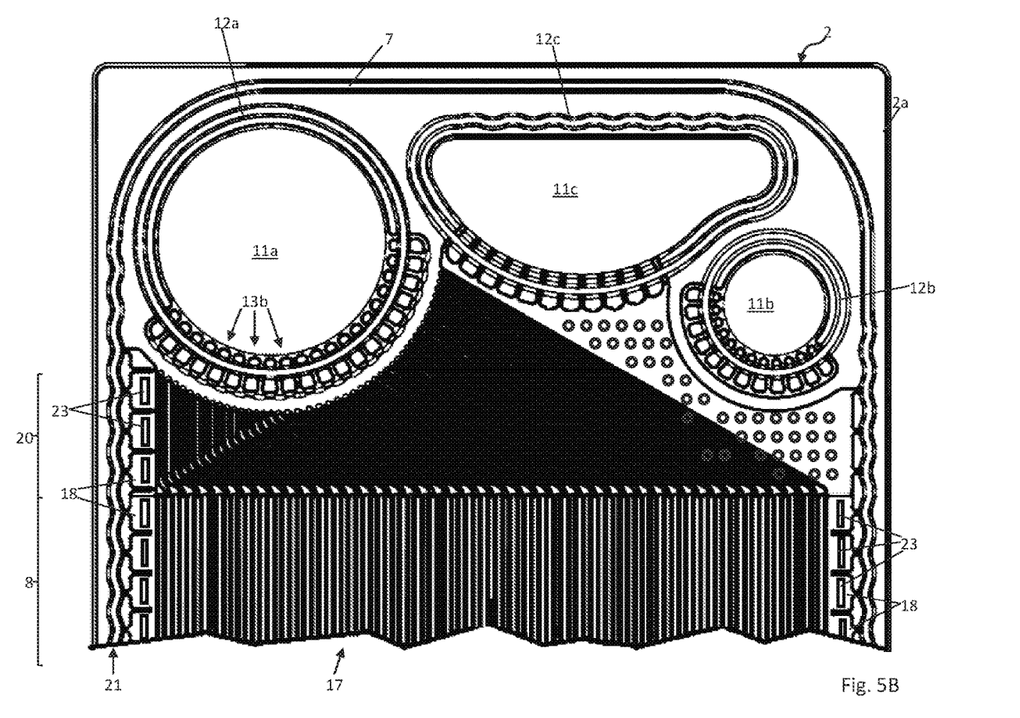
FIG. 5B shows a detail of a plan view of a bipolar plate according to the invention.

Functionally-equal structures in contrast are shown in FIG. 5B which shows a detail of a plan view of a bipolar plate according to the invention and specifically in a detail which corresponds to that of FIG. 2. Here, a rectangular recess 23 is present in each barrier element 18, said recess preventing or at least greatly limiting a flow of coolant from the rear side of the active region 8 to the interior 21 of the bead 7. In the shown detail, further barrier elements 18 each with a recess 23 are shown in the region left of the distributing region 20. A flow of coolant from the rear side of the distributing region 20 to the interior 21 of the bead 7 is prevented by way of this.

Figure 6A:
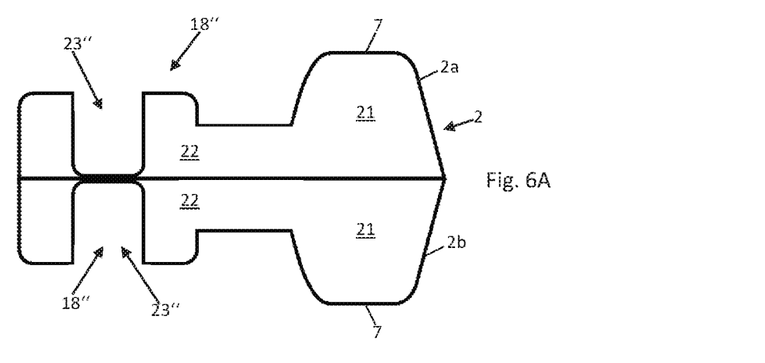
FIGS. 6A-C show schematic details of the bipolar plate of FIGS. 4A and 4B in a sectioned representation.
Figure 6B:
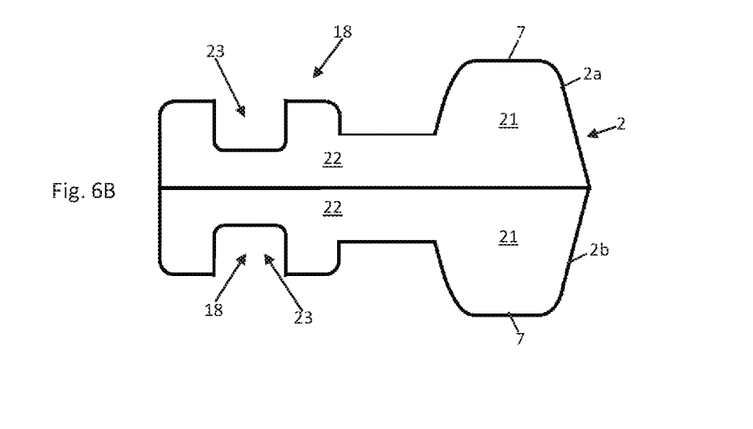
Figure 6C:
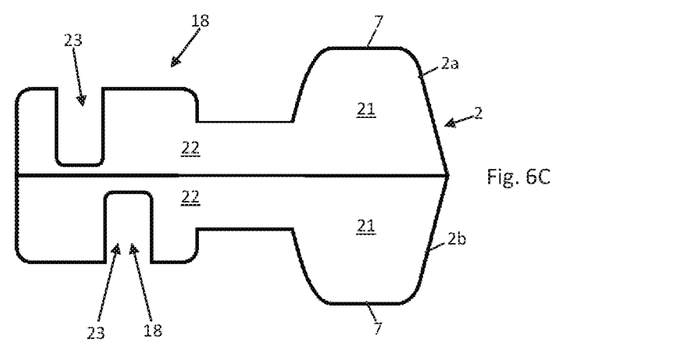

FIGS. 6A-C show different details of a bipolar plate 2 according to the invention, and specifically in each case in the region of one of the barrier elements 18, 18" which are represented in FIGS. 4A and 4B and are with embossed recess 23, 23" which in particular serve for preventing or reducing the flow of coolant from the rear side of the active region into the interior 21 of the bead 7. The section planes of FIGS. 6A-C are each perpendicular to the planar sur-face plane of the bipolar plate 2 or of the separator plates 2a, 2b. FIG. 6A shows that the recesses 23" of the barrier elements 18" contact one another and completely prevent the flow of coolant into the bead interior 21 in the region of the barrier elements 18". Furthermore, what can be derived from FIGS. 6A-C is the fact that the barrier elements 18, 18" are arranged in a partly overlapping manner and that the recesses 23, 23" of the two separator plates 2a, 2b can also be arranged in an overlapping manner (FIGS. 6A, 6B) as well as completely or at least partly offset (FIG. 6C), perpendicularly to the planar surface plane of the bipolar plate.

The invention claimed is:

1. A separator plate for an electrochemical system, in particular for a bipolar plate of an electrochemical system, comprising:

a first through-opening for leading a coolant through the separator plate; an active region with structures for leading a reaction medium along a first flat side of the separator plate and structures for leading a coolant along a rear side of the active region on the second flat side of the separator plate;

a bead which is formed integrally with the separator plate, for sealing at least the active region; and barrier elements which are formed integrally with the separator plate;

wherein the barrier elements are arranged between the active region and the bead and/or are arranged between a distributing region of the separator plate and the bead, wherein the distributing region is configured for leading the coolant from the through-opening to the rear side of the active region or from the rear side of the active region to the through-opening on the second flat side of the separator plate; and wherein the barrier elements are formed in a manner such that they reduce or prevent a flow of reaction medium on the first flat side of the separator plate along the bead and past the active region;

wherein the bead completely encompasses both the first through-opening and the active region and that at least one of the barrier elements is recessed at least in regions, in particular for reducing or for preventing a coolant flow on the second flat side of the separator plate in the region of this barrier element between the rear side of the active region and an interior of the bead and/or between a rear side of the distributing region and the interior of the bead.

2. The separator plate according to claim 1, with a second through-opening for leading a coolant through the separator plate, wherein the bead also completely encompasses the second through-opening and the first through-opening and the second through-opening are arranged on sides of the active region which lie opposite one another.

3. The separator plate according to claim 1, wherein, the recess of one or more of the barrier elements is at least one of:
   distanced to the edges of the barrier element,
   elongate shaped and is aligned parallel or essentially parallel to the main extension direction of the bead,
   reduced by at least by 50 percent in a cross section, defined perpendicularly to the planar surface plane of the separator plate of a connection between the rear side of the active region and the interior of the bead on the second flat side of the separator plate, said connection being formed by the barrier element, and
   extends over the complete barrier element at least in one direction.

4. The separator plate according to claim 1, wherein one or more of the barrier elements reaches or reach up to the active region and up to the bead.

5. The separator plate according to claim 1, wherein one or more of the barrier elements, at least in sections, are aligned transversely to the main extension direction of the bead.

6. The separator plate according to claim 1, wherein one or more of the barrier elements are formed in a manner such that a cross section of the respective barrier element tapers towards the bead and, the respective barrier element defined perpendicularly to the planar surface plane of the separator plate, and the taper is by at least 50 percent.

7. The separator plate according to claim 6, wherein the cross section tapers along a direction parallel to the planar surface plane of the separator plate, and parallel to the main extension direction of the bead.

8. The separator plate according to claim 6, wherein the tapering is effected in a step-like manner in one or several of the barrier elements.

9. The separator plate according to claim 1, wherein at least some of the barrier elements which are adjacent to one another are connected to one another by way of a connection which is aligned parallel to the main extension direction of the bead.

10. The separator plate according to claim 1, with a distributing structure for distributing coolant over the rear side of the active region, wherein the distributing structure is oriented transversely to the flow direction of the coolant along the rear side of the active region and reaches up to an end of the active region which faces the bead.

11. The separator plate according to claim 1, with at least one recess which extends transversely to the flow direction of the coolant along the rear side of the active region in a continuous manner from the active region up to the bead.

12. The separator plate according to claim 10, wherein the barrier elements are arranged in a row parallel to the main extension direction of the bead and wherein the recess which extends continuously from the active region to the bead is arranged at an end of this row which faces the distributing structure.

13. The separator plate according to claim 1, with a first port bead which completely encompasses the first through-opening and a second port bead which completely encompasses the second through-opening.

14. The separator plate according to claim 1, which is formed from a metal sheet wherein at least one, more or all of the following elements are embossed into the separator plate:
   the bead or beads;
   the structures of the active region;
   distributing structures of the distributing region;
   the barrier elements; and/or
   the recesses.

15. A bipolar plate for an electrochemical system with a first separator plate according to claim 1 and a second separator plate, wherein both separator plates are connected to one another, wherein the first through-openings of the two separator plates are arranged in an aligned manner for forming a first through-opening of the bipolar plate, wherein a cavity enclosed between the two separator plates for leading a coolant through the bipolar plate and wherein the first through-opening of the bipolar plate is in fluid connection with the cavity.

16. The bipolar plate according to claim 15, wherein the second through-openings of the two separator plates are arranged in an aligned manner for forming a second through-opening of the bipolar plate and wherein the second through-opening of the bipolar plate is in fluid connection with the cavity.

17. The bipolar plate according to claim 15, wherein the barrier elements of the first separator plate and the barrier elements of the second separator plate are arranged at least regionally in an overlapping manner and wherein the recesses of the barrier elements of the first separator plate and the recesses of the barrier elements of the second separator plate are arranged at least partly offset parallel to the planar surface plane of the bipolar plate or an at least partly over-lapping manner.

18. The bipolar plate according to claim 16, wherein the cavity which is enclosed between the two separator plates comprises a first part-space and a second part-space, wherein the first part-space is enclosed between the active region of the first separator plate and the active region of the second separator plate, wherein the second part-space is enclosed between the bead of the first separator plate and the bead of the second separator plate, wherein the first through-opening of the bipolar plate and the second through-opening of the bipolar plate are connected via a first fluid connection which comprises the first part-space, and wherein the first through-opening of the bipolar plate and the second through-opening of the bipolar plate are connected via a second fluid connection which comprises the second part-space, wherein a minimal cross section $A1,min$ of the first fluid connection is larger than a minimal cross section $A2,min$ of the second fluid connection, wherein $A1,min \geq 10 \cdot A2,min$.

19. An electrochemical system with a plurality of bipolar plates according to claim 15, which are arranged into a stack, wherein a respective membrane electrode assembly (MEA) is arranged between adjacent bipolar plates of the stack, wherein each of the MEA in the active region of the adjacent bipolar plates comprises an ionomer and at least one gas diffusion layer.

20. The electrochemical system according to claim 19, wherein each of the MEA comprises a reinforced edge region which at least in regions overlaps with the barrier elements of the bipolar plates, said bipolar plates being adjacent to the MEA.

* * * * *